(12) United States Patent
Weber

(10) Patent No.: US 6,864,438 B2
(45) Date of Patent: Mar. 8, 2005

(54) LOAD RECEIVER AND LOADING STAGE FOR A BALANCE, AND MASS COMPARATOR EQUIPPED WITH THE LOAD RECEIVER AND LOADING STAGE

(75) Inventor: René Weber, Oetwil am See (CH)

(73) Assignee: Mettler-Toledo GmbH, Greifensee (CH)

( * ) Notice: Subject to any disclaimer, the term of this patent is extended or adjusted under 35 U.S.C. 154(b) by 227 days.

(21) Appl. No.: 10/002,930

(22) Filed: Nov. 15, 2001

(65) Prior Publication Data

US 2002/0096371 A1 Jul. 25, 2002

(30) Foreign Application Priority Data

Dec. 4, 2000 (DE) .......................... 100 60 161

(51) Int. Cl.⁷ ............................................. G01G 19/00
(52) U.S. Cl. ................... 177/145; 177/253; 177/262
(58) Field of Search ............................. 177/145–147, 177/253, 262, 263

(56) References Cited

U.S. PATENT DOCUMENTS

| 186,149 | A | * | 1/1877 | Montgomery | 177/262 |
| 1,080,398 | A | * | 12/1913 | Wright | 177/262 |
| 3,092,196 | A | * | 6/1963 | Sheetz | 177/145 |
| 5,064,009 | A | * | 11/1991 | Melcher et al. | 177/145 |
| 5,294,004 | A | * | 3/1994 | Leverett | 177/145 |
| 5,306,877 | A | * | 4/1994 | Tas | 177/145 |
| 5,677,516 | A | * | 10/1997 | Leverett | 177/145 |
| 6,302,577 | B1 | * | 10/2001 | Jennings et al. | 177/145 |
| 6,420,666 | B1 | * | 7/2002 | Baumeler et al. | 177/145 |
| 6,627,826 | B2 | * | 9/2003 | Cavina et al. | 177/145 |

OTHER PUBLICATIONS

"Wiley Encyclopedia of Electrical and Electronics Engineering, vol. 23", John Webster, Ed., University of Wisconsin–Madison, John Wiley & Sons, New York, NY, Copyright 1999, pp. 571–572.*
"McGraw–Hill Encyclopedia of Science and Technology, vol. 2", McGraw–Hill, New York, NY, Copyright 1977, pp. 74–75.*

* cited by examiner

Primary Examiner—Randy W. Gibson
(74) Attorney, Agent, or Firm—Friedrich Kueffner

(57) ABSTRACT

A load receiver (10) for a balance with arms (11) is designed to support weights of various shapes and sizes (13, 14, 15, 16) by cradling the weights in a depression sloped at a variable slope angle towards the middle of the load receiver. A loading stage (1) arranged to cooperate with the load receiver (10) has one or more weight-placement devices (5) designed so that the load receiver (10) can reach through the weight-placement device (5) without touching the latter. The loading stage (1) and the load receiver (10) are moveable up and down in relation to each other. The weight-placement device (5) is suitably configured to support the different weights (13, 14, 15, 16). The load receiver (10) and loading stage (1) are used in a mass comparator for testing weight standards with a high degree of precision.

40 Claims, 3 Drawing Sheets

LOAD RECEIVER AND LOADING STAGE FOR A BALANCE, AND MASS COMPARATOR EQUIPPED WITH THE LOAD RECEIVER AND LOADING STAGE

BACKGROUND OF THE INVENTION

The invention relates to a load receiver and a loading stage, and it also relates to a balance, particularly a mass comparator, that is equipped with the inventive load receiver and/or loading stage. The load receiver has an arrangement of narrow ridges and a horizontal receiving surface for a weight, with a depression or concavity so that the center of the load receiver is lower than the peripheral portions. The loading stage supports at least one weight-loading device, which can be connected to the loading stage and is shaped so that the load receiver reaches from below through the weight-loading device without touching the latter. The loading stage and the load receiver are movable up and down in relation to each other.

A load receiver with a funnel-shaped depression at the center as disclosed in U.S. Pat. No. 5,332,870 is designed for the specific purpose of weighing flat filters. The conical surface of the load receiver consists of a net or a metal foil with perforations.

Loading stages are found in comparator balances for masses and volumes and serve to automatically interchange weights that are being compared to each other. This type of balance is used for the exact determination of masses and volumes of weight standards, primarily in governmental institutes of metrology. The comparison weighings often involve weights of different sizes.

A mass comparator balance with a load receiver designed for weights of unequal size is described in the German utility model DE U 295 17 368. It has a freely suspended load receiver with an arrangement of narrow ridges to support the weight standards that are to be tested. A weight-exchanging mechanism has a weight-loading and -unloading plate perforated by slots. When the weight-exchanging mechanism lowers the loading/unloading plate to set a weight on the load receiver, the ridges of the load receiver pass through the slots and take up the weight. The arrangement of narrow ridges of the load receiver consists of at least four branches that are joined by a connecting ridge. This design also allows a plurality of weights of different sizes to be weighed together with the highest degree of accuracy.

It is possible that a weight comparison involves test masses of different shapes, such as spherical weights, cylindrical weights with knobs, or disc-shaped weights. This makes it necessary to place individual weights of different shape and size in an exactly centered position on the load receiver, e.g., to limit the magnitude of eccentric loading errors as much as possible and, as an ultimate purpose, to perform a precise comparison that is independent of the shapes of the masses being compared. The mass comparator according to the last-mentioned reference does not meet this requirement, based on the design of its load receiver and/or weight-changing mechanism.

OBJECT OF THE INVENTION

In view of the state of the art as described above, the present invention has the objective of proposing a load receiver for a balance, particularly a mass comparator, which, preferably in combination with a loading stage, has the capability to receive test masses of different shapes and sizes without a loss of precision due to a less than perfectly centered placement of the test weights. As a further objective, the invention aims to provide a design for a loading stage which, in cooperation with a load receiver, will put the test weights in a precisely centered position on the load receiver. In addition, the present invention has the objective of providing a mass comparator balance that allows test weights of different shapes and sizes to be measured with high precision.

SUMMARY OF THE INVENTION

As a solution to the foregoing problem, the present invention proposes a load receiver for a balance with an arrangement of arms for supporting the masses to be weighed. The load-supporting surface of the load-receiver forms a depression, sloping downward towards the center of the load receiver at an angle that varies along the load-receiver arms.

A load receiver designed according to this concept can support weights of different shapes and sizes. A weight can be centered accurately on the load receiver regardless of the shape and size of the weight, which is a significant factor in high-precision weighing.

In an advantageous embodiment of the invention, the load receiver has at least one step in its downward-sloping profile and/or at least one horizontal portion.

The top surface of the load-receiver arms is preferably also slanted perpendicular to the main direction of the aforementioned slope. In addition, the load-receiver arms may have sideways breaks or bends.

In a preferred embodiment of the invention, the arms of the load receiver are shaped like wings extending from a common root portion at the center of the load receiver. In particular, the load receiver has four wing-shaped arms arranged mirror-symmetrically in relation to a vertical plane through the center of the load-receiver. The four arms are arranged to form two wing pairs, where the arms of a pair enclose an angle of less than 90°.

A preferred means for putting a weight on a load receiver with an arrangement of arms to support the weight consists of a loading stage with at least one weight-placement device, where the load receiver reaches through the weight-placement device without contacting the latter as the weight-placement device and the load receiver move up and down in relation to each other. Each of the weight-placement devices is shaped with a depression sloping downward towards the center of the weight-placement device and has a free space in the area of its centerpoint.

The inventive loading stage in combination with a specially configured load receiver has the advantage that the weight-placement device can accommodate weights of different shapes and sizes and that the weights can be centered more easily with a load receiver and weight-placement device that do not have a planar seating surface of the kind that is known in the prior art. In particular, this saves time in the weighing process while at the same time improving the precision of the weighing, independent of the shape and size of the weight. In addition, the exact positioning of the weight when the latter is put on the weight-placement device is easier and less time-consuming in comparison to prior-art devices.

A preferred embodiment of the loading stage according to the invention has one weight-placement device, which has a free cutout space between the resting points where a weight rests on the weight-placement device. The resting points on the weight-placement device are in close proximity to corresponding load-receiver seating points where the weight is seated on the load receiver as the latter reaches from below through the cutout space in the weight-placement device. It is advantageous if the load receiver likewise has a top surface shaped with a depression at the center, and if the depressions of the load receiver and the weight-placement device have the same slope angles varying in the same manner along the profile of the depressions.

In an advantageous embodiment of the loading stage, the weight-placement device has arcuate, loop-shaped weight-placement members holding the weights. The substantially upward-facing top surface of each weight-placement member is slanted towards the inside of the loop at a slant angle that can vary from the periphery toward the center of the weight-placement device. The weight-placement members can also have sideways bends or breaks, and the material width of the weight-placement members can likewise vary from the periphery toward the center of the weight-placement device.

In a particularly preferred embodiment of the invention, the loading stage is configured substantially as a circular plate that is rotatably supported at its mid-portion and has at least two loading locations where weight-placement devices are installed. To automate the process of comparative weighing, the loading stage is turned by a motor, and the raising and lowering is also automated. The mounting attachment of the weight-placement devices on the disc of the loading stage is height- and level-adjustable.

The inventive concept is embodied in particular in a combination of a load receiver and a loading stage. The load receiver with an arrangement of arms to support the weight, and the loading stage with at least one weight-placement device, are configured so that the load-receiver and the weight-placement device do not touch each other as the load-receiver arms pass through the weight-placement device when the loading stage and the load receiver move up and down in relation to each other. The load receiver is shaped with a depression that is sloped to the midpoint of the load receiver, and each weight-placement device has a depression that is centered in relation to the load receiver, when the weight-placement device is positioned to place the weight on the load receiver. Also, each weight-placement device has a free break-through space in the area where the midpoint of the load receiver is located.

In the foregoing combination, the weight-placement device has two arcuate, loop-shaped weight-placement members, and the load receiver has four wing-shaped arms arranged in two pairs. When the weight-placement device is positioned to cooperate with the load receiver so that the latter passes through the weight-placement device, a wing of one pair and an adjacent wing of the other pair embrace each of the two loop-shaped members of the weight-placement device.

According to the invention, it is preferred to make the loading stage, the weight-placement device and/or the load receiver either of a plastic material and/or of a metal with a plastic coating.

To perform highly precise weight comparisons on test weights of different shapes and sizes, the present invention proposes a mass comparator that includes a balance with a load receiver having an arrangement of load-receiver arms to support the test weights. The mass comparator is further equipped with a loading stage with at least one weight-placement device, where the load receiver reaches through the weight-placement device without contacting the latter as the loading stage and the load receiver move up and down in relation to each other. Each of the weight-placement devices is shaped with a depression sloping to the center of the weight-placement device and has a free space in the area of its center point.

The inventive mass comparator has the advantage that its load receiver as well as the loading stage can accommodate weights of different shapes and sizes and that the weights can be centered more easily with a load receiver and weight-placement device that do not have a planar seating surface of the kind that is known in the prior art. In particular, this saves time in the weighing process while at the same time improving the precision of the weighing, independent of the shape and size of the weight. In addition, the exact positioning of the weight when the latter is put on the weight-placement device is easier and less time-consuming in comparison to prior-art devices.

In a further preferred embodiment of the mass comparator according to the invention, the weight-placement device also has a free cutout space between the resting points where a weight rests on the weight-placement device. The resting points on the weight-placement device are in close proximity to corresponding load-receiver seating points where the weight is placed on the load receiver as the latter reaches from below through the cutout space in the weight-placement device.

Other advantageous further developments of the mass comparator have a load receiver and/or weight-placement device shaped with a depression of varying slope angle from the periphery towards the center, with the slope angles of the load receiver and the weight-placement device varying in the same manner along the profile of the respective depressions.

In a particularly advantageous further development of the mass comparator, the weight-placement device has arcuate, loop-shaped weight-placement members, and/or the load receiver has wing-shaped arms, with the respective shapes of the loop-shaped members and the wing-shaped arms conforming to each other. Preferably, there are four wing-shaped arms in a mirror-symmetric arrangement relative to a vertical plane through the center of the load receiver. The wings reach through the weight-placement device, with two of the wings embracing each loop-shaped weight-placement member.

In a preferred embodiment of a mass comparator according to the invention, the substantially upward-facing top surface of each weight-placement member and/or of each load-receiver arm is slanted perpendicular to the slope direction of the depression. The weight-placement members can also have sideways bends or breaks, and the material width of the weight-placement members can likewise vary from the periphery toward the center of the weight-placement device. In addition the weight-placement device and/or the load receiver can have steps and horizontal seating surfaces along their slopes.

A particularly preferred embodiment of the inventive mass comparator has a loading stage configured substantially as a circular plate that is rotatably supported at its mid-portion and has at least two loading locations where weight-placement devices are installed. To automate the process of comparative weighing, the loading stage is turned by a motor, and the raising and lowering is also automated. The mounting attachment of the weight-placement devices on the disc of the loading stage is height- and level-adjustable. The loading stage, weight-placement device and/or load receiver are made preferably of a plastic material and/or of metal with a plastic coating. Preferably, the load-receiver frame is freely suspended.

BRIEF DESCRIPTION OF THE DRAWINGS

Details of a load receiver and loading stage for a balance, particularly for a mass comparator, will be discussed in the following description of an embodiment that is illustrated in the drawings, wherein.

DETAILED DESCRIPTION OF THE INVENTION

Figure 1:
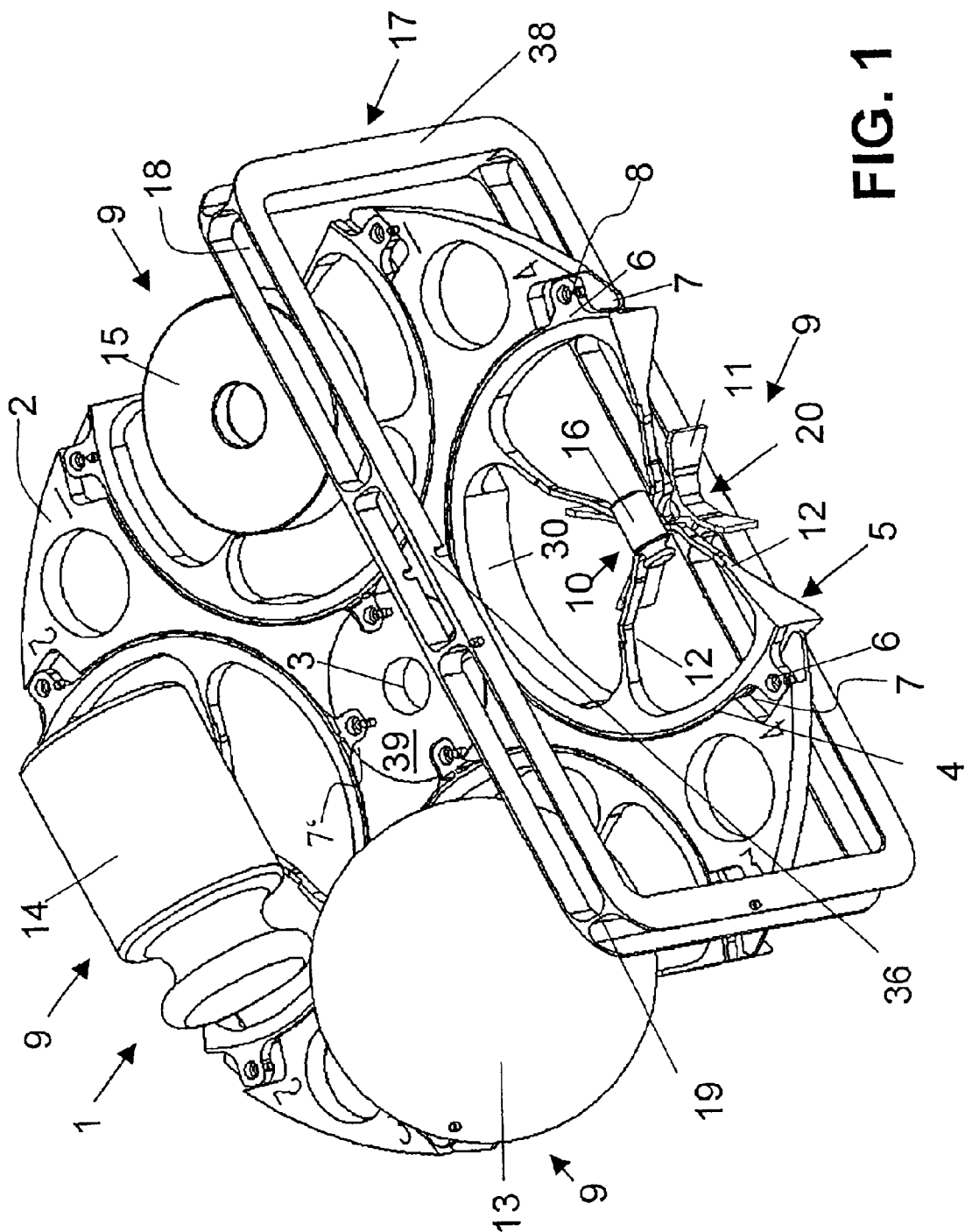
FIG. 1 represents a perspective view from above showing how a frame-shaped carrier for the load receiver of a balance cooperates with a loading stage carrying four different weights to be tested.

FIG. 1 illustrates a loading stage 1 with four loading locations 9 serving to automatically place test weights on a load receiver. The number of loading locations 9 could, of course, be more or less than four, but the preferred arrangement of the loading locations is in a circle at equal intervals as illustrated. The loading stage 1 consists of a substantially circular disc 2 with an opening 3 through its mid-portion 39. The disc 2 is rotatably supported on a vertical shaft (not shown) passing through the opening 3. At each of the four loading locations 9, the loading stage has a cutout 4 in the shape of a circular segment to receive a weight-placement device 5. Each weight-placement device 5 has three fastening lugs 6 that fit into recesses 7, 7' of the loading stage 1 and serve to fasten the weight-placement devices 5 to the loading stage 1. The fastenings lugs 6 pointing towards the mid-portion 39 are fastened in recesses 7' which have a defined vertical depth that defines a reference level for the weight-placement devices 5. The other two fastening lugs 6 of each weight-placement device 5 are underlayed with an elastically compressible spring element that cooperates with a fastener such as a screw 8, so that by turning the latter, the height of the respective lug can be adjusted to level the weight-placement device 5.

FIG. 1 shows a load receiver 10 cooperating with the weight-placement device 5 facing the viewer. The load receiver 10 has two pairs of wings 11 reaching up through the open space to the front and rear of the loop-shaped members 12 of the weight-placement device 5. A small knob-handle weight 16 is shown resting on the weight-placement device 5 that faces the viewer. A detailed description of the weight-placement device 5 and the load receiver 10 is given below in the context of the FIGS. 2 and 3. The term load receiver as used in the field of weighing technology represents that part of a balance which receives the load to be weighed, normally a weighing pan, but also includes any other kind of load-receiving device such as the specialized load receiver of the present invention.

The loading stage 1 is rotatable about its center for transporting the weights successively into position for weighing. In addition, the loading stage can be lowered and raised to put the test weights on the load receiver 10 and to subsequently take them off again. Setting down and lifting off the same weight several times in a row is also a method of centering a weight on the load receiver, as will be explained below in more detail. The load platform may be turned as well as lowered and raised automatically by a motor.

As shown in FIG. 1, the weights at the four loading locations 9 are of different shape and size: a spherical weight 13, a large knob-handle weight 14, a disc-shaped weight 15, and a small knob-handle weight 16. The knob-handle weights 14 and 16 are shown lying on their sides. It has been found that the latter position is more conducive for the weight to center itself. For volume determinations, which usually involve weighing the same object in air and in water (dry and wet weighing), the sideways position of cylindrical weights is preferable because it avoids the formation of air bubbles or air pockets that can occur at the underside of a cylindrical weight if it is lowered into the water in an upright position, especially if the weight has a recessed portion in its bottom surface. In this context it has to be mentioned, that by using the term mass comparator, a volume comparator is regarded to be included.

The load receiver 10, shown cooperating with the weight-placement device 5 carrying the small knob-handle weight 16, is supported by a rectangular load-receiver frame 17 which connects to the force transducer of the balance (not shown in the drawing). The opening width of the load-receiver frame 17 accommodates the segment of the disc 2 that is surrounded by the load-receiver frame 17. The upper horizontal member of the load-receiver frame 17 has a notch 36 at the center, where the load-receiver frame 17 is coupled to the force transducer, e.g., by means of a hook. At the midpoint of the lower horizontal member of the load-receiver frame 17, a load-receiver seat 20 is provided for the load-receiver 10. The design of the load-receiver frame 17 with slots 18 as shown in FIG. 1 minimizes weight while preserving an adequate degree of structural rigidity. The resulting structure of the load receiver frame 17 thus consists of two rectangular frames 38 connected by transverse webs 19.

Figure 2:
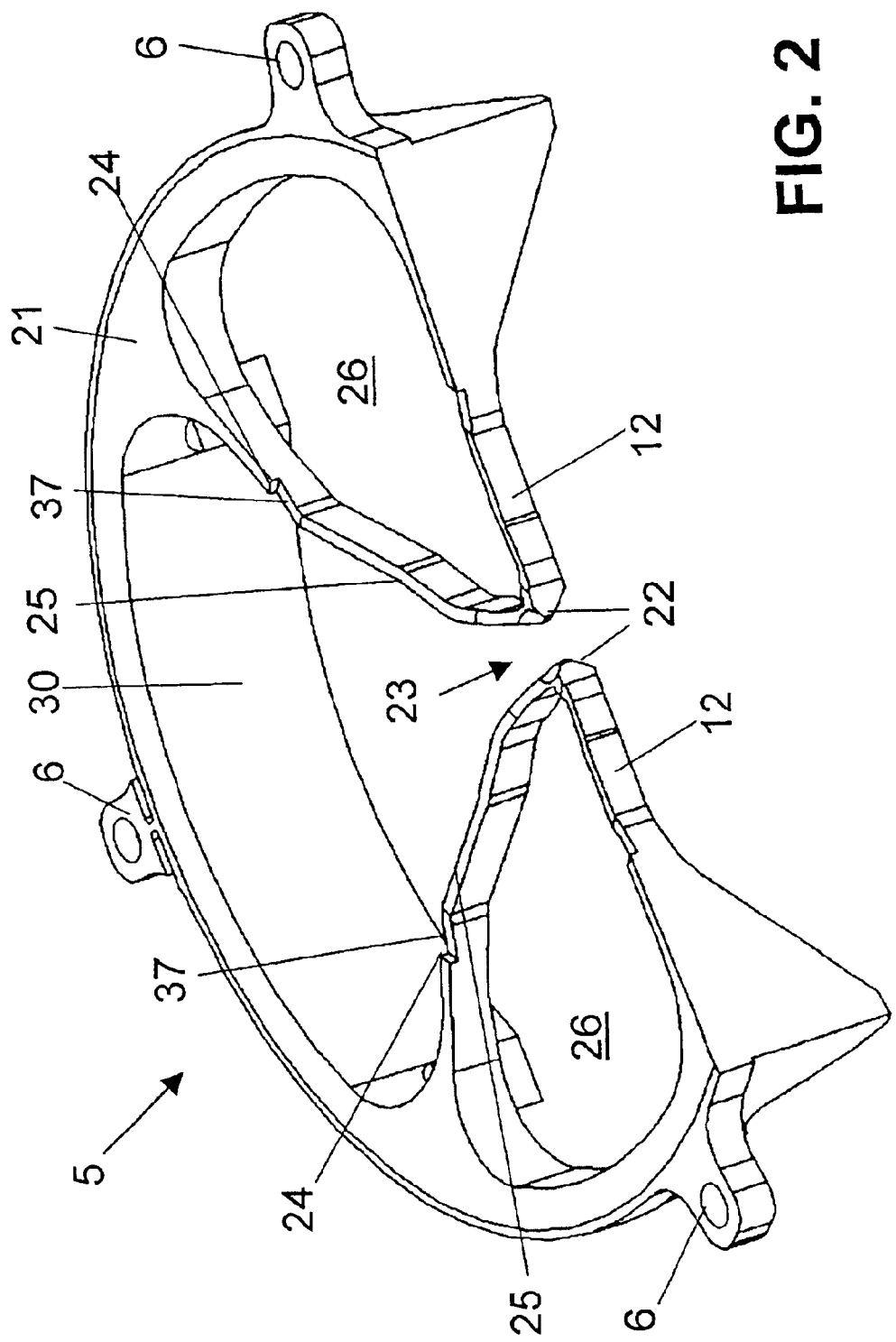
FIG. 2 represents a perspective view from above of a weight-placement device according to the invention.

FIG. 2 gives a perspective view of an embodiment of the weight-placement device 5 as seen from above at an oblique viewing angle. A rim 21 in the shape of a circular segment constitutes a supporting frame with three outward-pointing attachment lugs 6 positioned at about 120° from each other. Two weight-placement members 12, designed to hold the test weights, extend horizontally from the rim 21 towards the center 23 of the weight-placement device 5, forming narrow arches 22 near the center 23 to enhance the rigidity of the weight-placement members 12. A gap is left open between the narrow arches 22 as a passage for a part of the load receiver 10 (not shown in FIG. 2). The two arcuate weight-placement members 12 are not aligned with the horizontal plane of the loading stage 1 but are inclined at a downward angle, forming a depression with the lowest point at the narrow arches 22 near the center 23 of the weight-placement device 5. This design is enormously helpful in centering the weights. With spherical weights 15, the seating position is positively defined; with knob-handle weights 14, 16, the seating position is defined transverse to the cylinder axis and requires centering in the axial direction. The seating position for disc weights 15 is not defined, so that the latter need to be centered relative to more than one direction.

The weights are centered by the known process of seating and raising the weight on the load receiver 10 several times in succession by moving the loading stage 1 up and down. If the weight is not perfectly centered, the load receiver frame 17 with the load receiver 10 and the weight will swing to a slightly oblique position after the loading stage 1 has been lowered, because the combined center of gravity of the load receiver frame 17 with the load receiver 10 and the test weight has slightly moved in relation to the center of gravity with an empty load receiver 10. When the test weight is re-seated on the weight-placement device 5 by raising the loading stage 1, the center of gravity of the weight will be closer to the center of the weight-placement device 5 and consequently, the weight will be centered better on the load receiver 10 when the loading stage 1 is lowered again.

The weight-placement device 5 according to the invention is designed for a secure positioning of disc weights 15, so that the latter will not sit in a tilted position. Steps 24 at the topside of the arcuate weight-placement members 12, distanced from the center 23 in accordance with the diameter of the disc weights 15, provide horizontal resting surfaces 37 for stable positioning and preliminary centering of a disc weight 15.

The continuing vertical profile of the arcuate weight-placement members 12 towards the center 23 has a varying slope angle, as the upward-facing ridge surface 25 descends at an increasingly steeper downward slope towards the center 23. The ridge surface 25 may have sections of different constant slope angle, or the slope may increase continuously in a smoothly curved shape. Of course, the inclined ridges 25 may also be interrupted by additional steps 24, e.g., for the positioning of smaller-diameter disc weights 15.

As the ridge surfaces 25 are also slanted towards the free spaces 26 enclosed by the arcuate weight-placement members 12, a sphere 13 or a knob-handle weight 14, 16 will rest on four points of the mirror-symmetric weight-placement members 12, instead of the normal three-point support required for stable positioning of a body.

Furthermore, the horizontal direction of the weight-placement members 12 has several slight inward- or outward breaks or bends in relation to the enclosed free space 26. This design ensures greater versatility for accommodating knob-handle weights or other cylindrical weights of different height and diameter as well as spheres of different sizes.

The weight-placement device 5 is installed interchangeably at its loading location 9 (see FIG. 1). The weight-placement device 5 is precisely positioned by means of the fastening lug 6, which points to the mid-portion 39 of the loading stage 1 and is attached in a recess 7' of the mid-portion 39. The segment-shaped rim 21 of the weight-placement device 5 is reinforced with a cylindrical wall segment 30 which also serves as a guide in installing the weight-placement device 5 on the circular disc 2.

Figure 3:
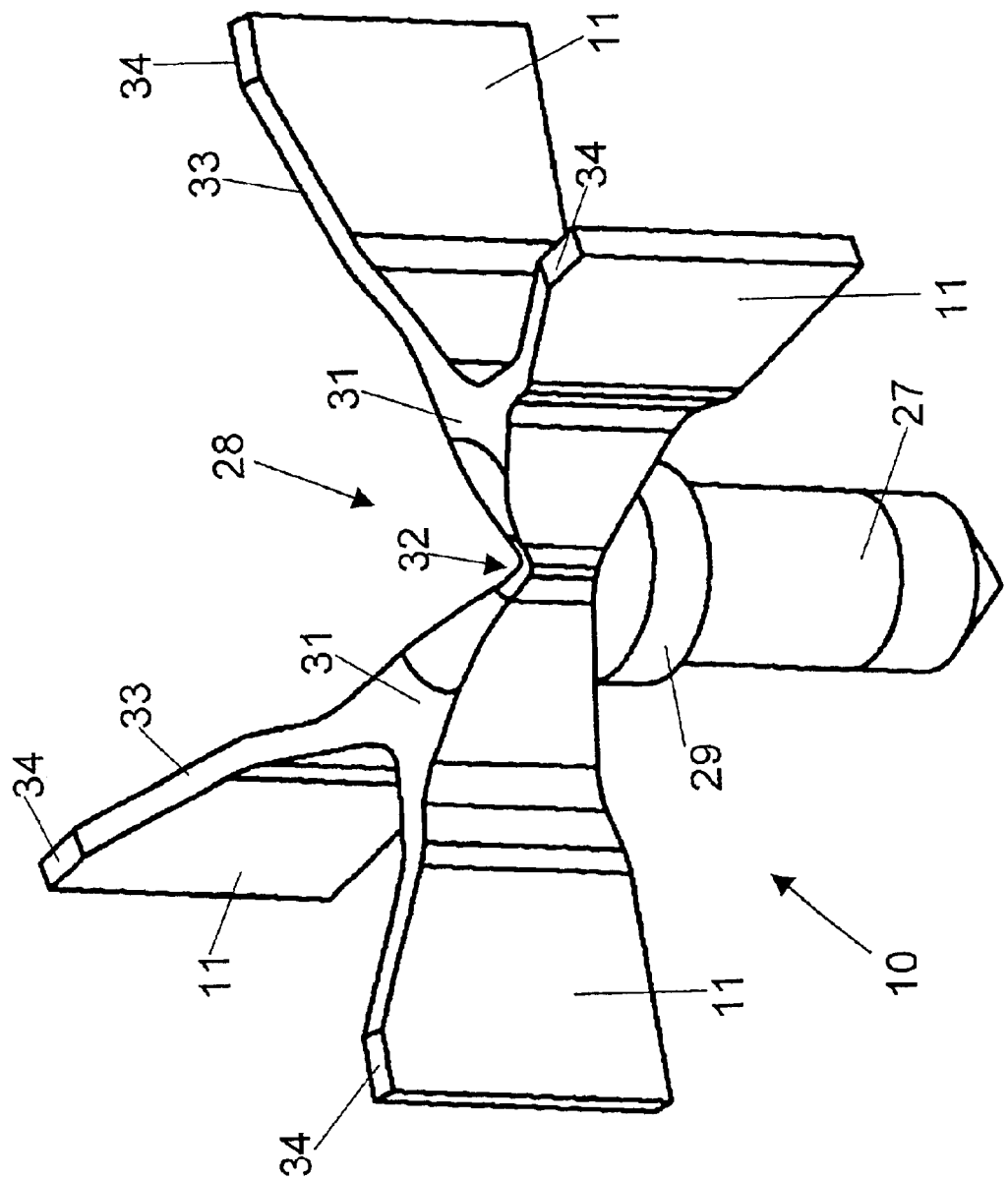
FIG. 3 represents a perspective view of a load receiver according to the invention.

As illustrated in FIG. 3, the load receiver 10 according to the invention has a cylindrical stem 27 with a conical point at the bottom and a support cradle 28 resembling two pairs of wings on top. Immediately below the support cradle 28, the stem 27 has a wider portion that serves as a load-receiver seat 29 for installing the load receiver 10 on the load-receiver frame 17.

The two pairs of wing-shaped load-receiver arms 11 meet at the center point 32, which also represents the center of gravity of the load receiver. Each pair of arms 11 is joined in a root portion 31. The arms of a pair enclose an angle of less than 90°, and the root portions are narrowed down towards the center point 32 of the load receiver 10.

Conforming to the arcuate shape of the weight-placement members 12 of the weight-placement device 5, the center point 32 of the load receiver 10 is at a lower level than the outer ends of the wing-shaped arms 11. The downward slope angle of the upward-facing ridge surfaces 33 becomes progressively steeper from the outer end of the arms 11 towards the center point 32. At their outer ends, the ridges 33 have an exactly horizontal portion 34 for the stable positioning of disc weights 15. In comparison to the horizontal ridge sections 37 of the weight-placement device 5, the horizontal ridge portions 34 of the arms 11 can extend farther towards the center point 32 of the load receiver 10. For the positioning of large disc weights there is no need for a step on the load receiver. However, if the load receiver 10 is to be used also for even smaller sizes of disc weights, the arms 11 will have to be designed with a step closer to the center point 32. Like the weight-placement members 12, the remaining portions of the ridges 33 of the load receiver 10 are also slanted perpendicular to the slope direction.

Also, like the arcuate weight-placement members 12 of the weight-placement device 5, the wing-shaped arms 11 of the load receiver 10 have at least two bends or breaks in a horizontal plane, so that they are slightly S-shaped. In the installed state, the load receiver 10 is oriented in relation to the weight-placement device 5 so that the arcuate weight-placement members 12 extend within the obtuse angles between the load-receiver arms 11. The horizontal profile of the root portions 31 of the load-receiver arms 11 conforms essentially to the shape of the members 12 of the weight-placement device 5, but leaving a small gap of about 1 to 2 millimeters. The vertical profiles, i.e., the slopes of the load-receiver arms 11 and the weight-placement members 12 run about parallel to each other. Furthermore, the top surfaces of the load-receiver arms 11 as well as the weigh-placement members 12 are slanted towards the free spaces 26 inside the arcuate members 12, with an increasingly steeper slant angle towards the center.

The loading stage 1, weight-placement device 5 and load receiver 10 are made preferably of a polymer material or of a metal with a polymer coating. This serves to prevent oxidation of these components if they are used for wet-weighing in a volume determination.

Preferably, the load-receiver frame 17 is freely suspended, but arrangements are possible where the load receiver 10 itself is suspended or in some other way connected to the balance, e.g., free-standing. Of course, one could also design a system where the load receiver 10 is raised and lowered instead of raising and lowering the loading stage.

LIST OF REFERENCE SYMBOLS 1 loading stage
2 circular disc
3 opening
4 segment-shaped cutout
5 weight-placement device
6 mounting lug
7, 7' recesses
8 screw
9 loading location
10 load receiver
11 wing-shaped arms of the load receiver
12 arcuate, loop-shaped members of the weight-placement device
13 spherical weight
14 large knob-handle weight
15 disc-shaped weight
16 small knob-handle weight
17 load-receiver frame
18 slot
19 transverse web
20 load-receiver seat
21 segment-shaped rim
22 narrow arch
23 center of the weight-placement device
24 step
25 upward-facing ridge surface
26 free space
27 stem of the load receiver
28 support cradle
29 load-receiver seat -continued

LIST OF REFERENCE SYMBOLS 30 cylinder wall segment
31 root portion
32 center point of the load receiver
33 upward facing surface of the load receiver
34 horizontally leveled portion
36 notch
37 horizontal surface portion
38 rectangular frame
39 mid-portion

What is claimed is:

1. A loading stage (1) for a balance, wherein the balance comprises a load receiver (10) with an arrangement of arms (11) designed to support a weight, and wherein the loading stage (1) comprises at least one weight-placement device (5) arranged so that the load receiver (10) can reach through the weight-placement device (5) without touching the latter, the loading stage (1) and the load receiver (10) being moveable up and down in relation to each other, and wherein further the at least one weight-placement device (5) has a second depression sloped at a variable second slope angle towards a center (23) of the weight-placement device (5), and the at least one weight-placement device (5) has an open space in an area of the center (23).

2. The loading stage (1) of claim 1, wherein the weight-placement device (5) has resting points for the weight and a free space (26) between the resting points, wherein the load receiver (10) has seating points for the weight, and wherein said resting points and said seating points are close to each other when the weight-placement device (5) is positioned so that the load receiver (10) reaches through the weight-placement device (5).

3. The loading stage (1) of claim 1, wherein the load receiver (10) has a first depression sloped towards a mid-point (32) of the load receiver, and wherein the first depression and the second depression are slope at substantially equally varying slope angles.

4. The loading stage (1) of claim 1, wherein the second depression is sloped at a second slope angle that becomes progressively steeper from the outer end towards said center (23) of the weight-placement device (5).

5. The loading stage (1) of claim 1, wherein the second depression is interrupted by at least one second step (24).

6. The loading stage (1) of claim 1, wherein the weight-placement device (5) comprises an arrangement of arcuate, loop-shaped weight-placement members (12).

7. The loading stage (1) of claim 2, wherein the weight-placement device (5) comprises an arrangement of arcuate, loop-shaped weight-placement members (12), wherein the free space (26) is located inside the arcuate loop of the weight-placement members (12) and the latter have a top surface (25) that is slanted towards said free space (26).

8. The loading stage (1) of claim 7, wherein the slant of the top (25) varies along the weight-placement members (12).

9. The loading stage (1) of claim 6, wherein the weight-placement members (12) have lateral breaks in curvature.

10. The loading stage (1) of claim 6, wherein the weight-placement members (12) have a variable width.

11. The loading stage (1) of claim 1, wherein at least one of the loading stage (1), the weight-placement device (5) and the load receiver (10) is made of one of a plastic material and a plastic-coated metal.

12. The loading stage (1) of claim 1, wherein the loading stage (1) comprises a substantially circular plate (2) with a mid-portion (39), said circular plate (2) being movably supported for rotation about an axis through the mid-portion (39) and having at least two loading locations (9) where weight-placement devices (5) are installed.

13. The loading stage (1) of claim 12, wherein the loading stage is further movable up and down, wherein said rotation is motorized and said up- and down-movement is automated for the purpose of automating a weighing process.

14. The loading stage (1) of claim 1, wherein the weight-placement device (5) is height- and level-adjustable in relation to the loading stage (1).

15. A combination of a load receiver (10) and a loading stage (1); wherein the loading stage (1) has at least one weight-placement device (5); wherein the loading stage (1) and the load receiver (10) are movable up and down in relation to each other and the load receiver (10) passes through the weight-placement device (5) without touching the latter; wherein the load receiver (10) has a first depression sloped towards a mid-point (32) of the load receiver (10), wherein each weight-placement device (5) has a depression sloped at a variable second slope angle towards said mid-point (32) of the load receiver (10) when the weight-placement device is positioned to put the weight on the load receiver, and wherein each weight-placement device has a free break-through space in an area of the mid-point (32).

16. The combination of claim 15, wherein the weight-placement device (5) has resting points for the weight and free spaces (26) between the resting points, wherein the load receiver (10) has seating points for the weights, and wherein said resting points are close to said seating points when the weight-placement device is in position to place weights on the load receiver (10).

17. The combination of claim 15, wherein the first depression is sloped substantially in conformity with the second depression when the weight-placement device is in position to place weights on the load receiver.

18. The combination of claim 15, wherein the weight-placement device (5) has two arcuate, loop-shaped weight-placement members (12) and the load receiver (10) has four wing-shaped arms (11) arranged in two pairs, and wherein a wing (11) of one pair and an adjacent wing (11) of the other pair embrace each of the two loop-shaped members (12) of the weight-placement device (5) when the latter is in position to place weights on the load receiver.

19. The combination of claim 15, wherein at least one of the loading stage (1), the weight-placement device (5), and the load receiver (10) is made of one of a plastic material and a plastic-coated metal.

20. A mass comparator comprising a balance with a combination of a load receiver (10) and a loading stage (1); wherein the loading stage (1) has at least one weight-placement device (5); wherein the loading stage (1) and the load receiver (10) are movable up and down in relation to each other and the load receiver (10) passes through the weight-placement device (5) without touching the latter; wherein the load receiver (10) has a first depression sloped towards a mid-point (32) of the load receiver (10), wherein each weight-placement device (5) has a depression sloped at a variable second slope angle towards said mid-point (32) of the load receiver (10) when the weight-placement device is positioned to put the weight on the load receiver, and wherein each weight-placement device has a free break-through space in an area of the mid-point (32).

21. The mass comparator of claim 20, wherein the weight-placement device (5) has resting points for the weight and free spaces (26) between the resting points, wherein the load receiver (10) has seating points for the weights, and wherein said resting points are close to said seating points when the weight-placement device is in position to place weights on the load receiver (10).

22. The mass comparator of claim 20, wherein the first depression is sloped at a variable slope angle.

23. The mass comparator of claim 20, wherein the first depression is sloped substantially in conformity with the second depression when the weight-placement device is in position to place weights on the load receiver.

24. The mass comparator of claim 20, wherein the weight-placement device (5) comprises an arrangement of arcuate, loop-shaped weight-placement members (12).

25. The mass comparator of claim 20, wherein the load receiver comprise wing-shaped arms (11) that are grouped around the mid-point (32), and have a common root portion (31).

26. The mass comparator of claim 25, wherein the load receiver (10) comprises four arms (11) arranged mirror-symmetrically in relation to a vertical plane through the mid-point (32).

27. The mass comparator of claim 26, wherein the four arms (11) are arranged in two pairs of arms, the arms of a pair enclosing an angle of less than 90°.

28. The mass comparator of claim 24, wherein the four arms are arranged in two pairs of arms, the arms of a pair enclosing an angle of less than 90°, and wherein an arm (11) of one pair and an adjacent arm (11) of the other pair embrace each of the two loop-shaped members (12) of the weight-placement device (5) when the latter is in position to place weights on the load receiver.

29. The mass comparator of claim 20, wherein the load receiver (10) has arms (11) with a top surface (33) that is slanted perpendicular to a direction pointing towards the midpoint (32) of the load receiver.

30. The mass comparator of claim 20, wherein at least one of the first depression and the second depression has at least one step.

31. The mass comparator of claim 20, wherein the load receiver (10) has wing-shaped arms (11) with at least one first horizontal surface portion (34) for disc-shaped weights (15).

32. The mass comparator of claim 24, wherein a free space (26) is located inside the arcuate loop of the weight-placement members (12) and the latter have a top surface (25) that is slanted towards said free space (26).

33. The mass comparator of claim 32, wherein the slant of the top surface (25) varies along the weight-placement members (12).

34. The mass comparator of claim 24, wherein the weight-placement members (12) and the arms (11) have lateral breaks in curvature.

35. The mass comparator of claim 24, wherein the weight-placement members (12) and the arms (11) have variable width from an outer area to the mid-point (32).

36. The mass comparator of claim 20, wherein at least one of the loading stage (1), the weight-placement device (5), and the load receiver (10) is made of one of a plastic material and a plastic-coated metal.

37. The mass comparator of claim 20, wherein the loading stage (1) comprises a substantially circular plate (2) with a mid-portion (39), said circular plate (2) being movably supported for rotation about an axis through the mid-portion (39) and having at least two loading locations (9) where weight-placement devices (5) are installed.

38. The mass comparator of claim 20, wherein the loading stage is further movable up and down, wherein said rotation is motorized and said up- and down-movement is automated for the purpose of automating a weighing process.

39. The mass comparator of claim 20, wherein the weight-placement device (5) is height- and level-adjustable in relation to the loading stage (1).

40. The mass comparator of claim 20, wherein the load receiver is mounted on a load-receiver frame (17) and the load-receiver frame (17) is freely suspended.

* * * * *